March 8, 1927.
W. R. TORBERT
1,620,045
AWNING
Filed July 19, 1926
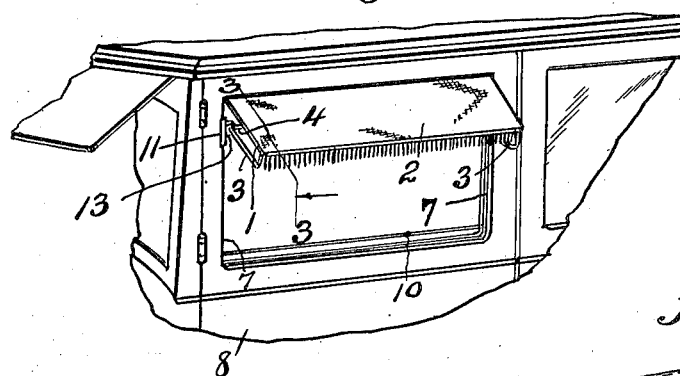
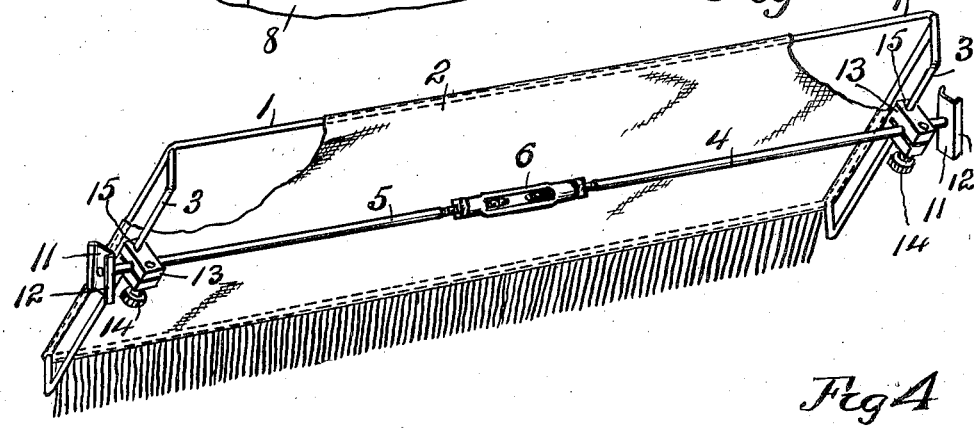
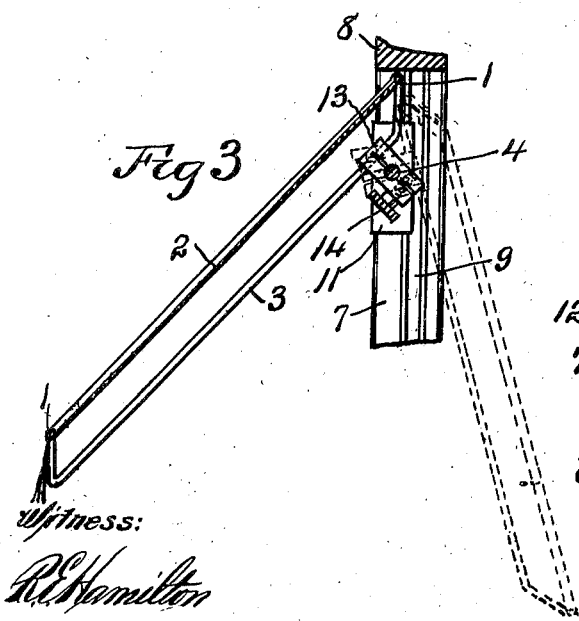
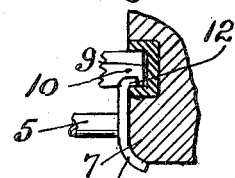
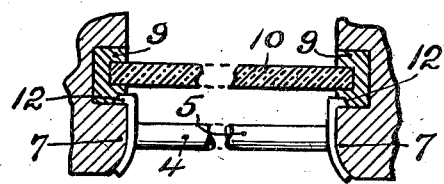
INVENTOR.
William R. Torbert
BY
Warren D. House
Itis ATTORNEY.
Witness:
R. E. Hamilton Patented Mar. 8, 1927.

1,620,045

UNITED STATES PATENT OFFICE.

WILLIAM R. TORBERT, OF KANSAS CITY, MISSOURI.

AWNING.

Application filed July 19, 1926. Serial No. 123,331.

My invention relates to improvements in awnings. It is particularly adaptable for use on the doors or windows of an automobile in which the glass of the door or window is slidably mounted in channels provided therefor.

One of the objects of my invention is to provide an awning of the kind described, which may be easily and quickly mounted in operative position on a door or window of an automobile or other structure, without the employment of accessory securing means other than contained in the awning structure, which may be tilted or moved inwardly or outwardly to different operative positions, or, if desired, adjusted to a position at the inner side of the door or window, and which can be securely fastened in the position to which it may be adjusted.
My invention provides further a novel awning, which is simple, cheap, durable, strong, not liable to get out of order, which is applicable to the doors or windows at either side of a car, and which can quickly and easily be changed from one door or window to another.

The novel features of my invention are hereinafter fully described and claimed.

In the accompanying drawing, which illustrates the preferred embodiment of my invention, Fig. 1 is a perspective view of my improved awning shown attached to the left front door of an automobile, a part only of which is shown.

Fig. 2 is an enlarged perspective view, partly broken away, of my improved awning.

Fig. 3 is an enlarged section on the line 3—3 of Fig. 1.

Fig. 4 is an enlarged cross section of a portion of the automobile door, a portion of one of the supporting rods being shown mounted thereon, the plate glass being shown lowered.

Fig. 5 is a horizontal enlarged sectional view, partly broken away, showing the rods engaging the door, as applied when the plate glass is raised.

Similar characters of reference designate similar parts in the different views.

1 designates the body of a substantially rectangular awning frame on which is stretched and fastened an awning sheet 2. The ends of the body 1 are respectively provided with two U-shaped depending extensions 3.

For supporting the awning frame, the following described parts may be employed.
Two horizontal rods 4 and 5 have oppositely threaded inner ends, which are connected for longitudinal adjustment with respect to each other by a turnbuckle 6. The outer ends of the rods 4 and 5 are provided with means for engaging and being supported by the jambs of a door or window, such as the jambs 7 of the automobile door 8. Said jambs are usually provided with oppositely disposed vertical felt channel bars 9 in which is slidably mounted the glass 10, Figs. 4 and 5, which, in these figures, is shown respectively lowered and raised.

Each of the rods 4 and 5 has fastened to its outer end a channel plate 11, one of the flanges 12 of which is mounted in the adjacent channel bar 9, Figs. 3 and 4. By turning the turnbuckle 6 in the proper direction on the rods 4 and 5, the latter may be forced apart to positions in which the channel plates 11 will firmly engage the adjacent jambs 7, whereby the rods 4 and 5 form a firm support upon which the awning frame may be adjusted to different positions. To effect this, I provide two clamping devices respectively mounted on the rods 4 and 5, each device consisting of a bifurcated member 13, the arms of which embrace the adjacent rod 4 or 5 as the case may be, and which are respectively provided with holes which aline with each other, one of the holes being threaded. A clamping screw 14 is rotatably mounted in said holes and its threads engage the threads of the threaded hole.

By turning the screws 14 in the proper direction, the bifurcated members 13 may be made to firmly grip the rods 4 and 5 respectively. The arms of said members 13 are slidable longitudinally on the rods and also circumferentially adjustable thereon.
Each member 13 is provided with a transverse hole extending through its arms, Figs. 2 and 3, and designated by 15, in which is longitudinally adjustably slidably fitted the transverse portion of the adjacent extension 3 of the awning frame. The holes 15 are transverse to the axis of the clamping members 13, so that the awning frame may be adjusted bodily as a whole transversely to said axis.

In the mounting of the awning on the car door or window, the turnbuckle is adjusted so that the channel plates 11 will pass between the jambs 7, after which the turnbuckle is turned so as to move the rods 4 and 5 apart until the flanges 12 respectively enter the channels of the channel bars 9 and the plates 11 are firmly seated against the jambs 7, the awning frame 1 being disposed in an inclined position at the outer side of the car body, as shown in Fig. 1, and in solid lines in Fig. 3. By loosening the screws 14, the awning frame may be tilted to different angles from the perpendicular, after which positioning, the screws 14 are turned to their clamping positions.

When desired, the frame 1 may be disposed within the car, as shown in dotted lines in Fig. 3. This may be effected by loosening the screws 14, then sliding the extensions 3 in the members 13 inwardly to the position relative to the members 13 shown in dotted lines in Fig. 3, and then swinging the frame 1 and members 13 to a depending position of the frame, as shown in dotted lines in Fig. 3.

When the plate glass 10 is lowered, as shown in Figs. 1 and 4, the flanges 12 may be disposed in the channels of the felt bars 9, and when the glass is raised, as shown in Fig. 5, the flanges 12 may compress the felt at the outer side of the glass.

By loosening the turnbuckle 6, the plates 11 may be detached from the jambs, and the awning taken down.

I do not limit my invention to the structure shown and described, as many modifications, within the scope of the appended claims, may be made without departing from the spirit of my invention.

What I claim is:—

1. In an awning, a support having means for engaging and being supported by the jambs of a door or window, two devices circumferentially adjustable on said support, an awning frame adjustable bodily as a whole on said devices transversely to the axis of the latter, and an awning sheet mounted on said frame.

2. In an awning, a support having means for engaging and being supported by the jambs of a door or window, two devices circumferentially and longitudinally adjustable on said support, an awning frame adjustable bodily as a whole on said devices transversely to the axis of the latter, and an awning sheet mounted on said frame.

3. In an awning, two rods having means for engaging and being supported by the jambs of a door or window, a turnbuckle connecting said rods, two devices respectively mounted on said rods, an awning frame adjustable bodily as a whole on said devices transversely to said rods, and an awning sheet mounted on said frame.

4. In an awning, two rods having means for engaging and being supported by the jambs of a door or window, a turnbuckle connecting said rods, two devices respectively circumferentially adjustable on said rods, an awning frame bodily as a whole adjustable on said devices transversely to the axis of the latter, and an awning sheet mounted on said frame.

5. In an awning, two rods having means for engaging and being supported by the jambs of a door or window, a turnbuckle connecting said rods, two devices circumferentially adjustable on said rods respectively and respectively longitudinally adjustable thereon, an awning frame adjustable bodily as a whole on said devices transversely to the axis of the latter, and an awning sheet mounted on said frame.

6. In an awning, two rods having means for engaging and being supported by the jambs of a door or window, a turnbuckle connecting said rods, an awning frame, an awning sheet mounted on said frame, and means by which said frame is adjustable bodily as a whole transversely to and circumferentially on and supported by said rods.

7. In an awning, two rods having means for engaging and being supported by the jambs of a door or window, a turnbuckle connecting said rods, two clamping devices, each comprising a bifurcated member, the arms of which embrace one of said rods and a clamping screw engaging said arms for forcing them to the clamping position, said devices being respectively circumferentially adjustable on said rods, an awning frame bodily as a whole adjustable on said members transversely to the axis thereof, and an awning sheet mounted on said frame.

In testimony whereof I have signed my name to this specification.

WILLIAM R. TORBERT.